United States Patent
Itoh et al.

(10) Patent No.: US 11,610,581 B2
(45) Date of Patent: Mar. 21, 2023

(54) MULTI-STEP LINEAR INTERPOLATION OF LANGUAGE MODELS

(71) Applicant: INTERNATIONAL BUSINESS MACHINES CORPORATION, Armonk, NY (US)

(72) Inventors: Nobuyasu Itoh, Sapporo (JP); Masayuki Suzuki, Tokyo (JP); Gakuto Kurata, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 49 days.

(21) Appl. No.: 17/168,982

(22) Filed: Feb. 5, 2021

(65) Prior Publication Data
US 2022/0254335 A1  Aug. 11, 2022

(51) Int. Cl.
*G10L 15/187* (2013.01)
*G10L 15/197* (2013.01)
*G10L 15/06* (2013.01)
*G10L 15/26* (2006.01)
(Continued)

(52) U.S. Cl.
CPC .......... *G10L 15/187* (2013.01); *G06K 9/6226* (2013.01); *G10L 15/063* (2013.01); *G10L 15/16* (2013.01); *G10L 15/197* (2013.01); *G10L 15/26* (2013.01); *G10L 2015/0631* (2013.01); *G10L 2015/0635* (2013.01)

(58) Field of Classification Search
CPC ..... G10L 15/187; G10L 15/063; G10L 15/16; G10L 15/197; G10L 15/26; G10L 2015/0631; G10L 2015/0635; G06K 9/6226
See application file for complete search history.

(56) References Cited

U.S. PATENT DOCUMENTS

| | | | |
|---|---|---|---|
| 7,275,029 B1 | 9/2007 | Gao et al. | |
| 9,734,826 B2* | 8/2017 | Levit | G10L 15/197 |
| 10,032,463 B1* | 7/2018 | Rastrow | G10L 15/183 |

(Continued)

OTHER PUBLICATIONS

Ando et al., "Converting Written Language to Spoken Language with Neural Machine Translation for Language Modeling", ICASSP 2020—2020 IEEE International Conference on Acoustics, Speech and Signal Processing (ICASSP), May 2020, pp. 1-5.

(Continued)

*Primary Examiner* — Fariba Sirjani
(74) *Attorney, Agent, or Firm* — Tutunjian & Bitetto, P.C.; Randy Emilio Tejeda

(57) ABSTRACT

A computer-implemented method is provided for generating a language model for an application. The method includes estimating interpolation weights of each of a plurality of language models according to an Expectation Maximization (EM) algorithm based on a first metric. The method further includes classifying the plurality of language models into two or more sets based on characteristics of the two or more sets. The method also includes estimating a hyper interpolation weight for the two or more sets based on a second metric specific to the application. The method additionally includes interpolating the plurality of language models using the interpolation weights and the hyper interpolation weight to generate a final language model.

14 Claims, 6 Drawing Sheets

(51) Int. Cl.
  *G10L 15/16*   (2006.01)
  *G06K 9/62*    (2022.01)

(56) References Cited

U.S. PATENT DOCUMENTS

| | | | | |
|---|---|---|---|---|
| 2002/0032549 | A1* | 3/2002 | Axelrod | G10L 15/01 |
| | | | | 703/2 |
| 2002/0128821 | A1* | 9/2002 | Ehsani | G10L 15/005 |
| | | | | 704/E15.04 |
| 2005/0228667 | A1 | 10/2005 | Duan et al. | |
| 2007/0033002 | A1* | 2/2007 | Dymetman | G06F 40/253 |
| | | | | 704/5 |
| 2011/0258229 | A1* | 10/2011 | Ni | G06F 16/24 |
| | | | | 704/8 |
| 2012/0109651 | A1* | 5/2012 | Chen | G06F 16/313 |
| | | | | 707/E17.049 |
| 2015/0073788 | A1 | 3/2015 | Sak et al. | |
| 2015/0254233 | A1 | 9/2015 | Artzi et al. | |
| 2015/0312200 | A1* | 10/2015 | Brav | G06F 40/284 |
| | | | | 709/206 |
| 2016/0267905 | A1* | 9/2016 | Levit | G10L 15/183 |
| 2017/0193391 | A1* | 7/2017 | Chen | G06N 20/00 |
| 2017/0300563 | A1* | 10/2017 | Kao | G06N 20/00 |
| 2018/0315420 | A1* | 11/2018 | Ash | G09B 19/06 |
| 2019/0286996 | A1* | 9/2019 | Tian | G06F 16/90332 |
| 2022/0084510 | A1* | 3/2022 | Peng | G06F 40/30 |

OTHER PUBLICATIONS

Arora et al., "Contrastive Entropy: A new evaluation metric for unnormalized language models", arXiv:1601.00248v2 [cs.CL] Mar. 31, 2016, pp. 1-5.

Bacchiani et al., "Unsupervised Language Model Adaptation", ICASSP 2003, 2003 IEEE International Conference on Acoustics, Speech, and Signal Processing, 2003. Proceedings. (ICASSP '03), Apr. 2003, pp. I-224-I227.

Language and Statistics, "The "Degenerate EM" Algorithm for Finding Optimal Linear Interpolation Coefficients $\lambda i$", Feb. 5, 2007, 1 page.

Hsu, "Generalized Linear Interpolation of Language Models", ASRU 2007, Dec. 2007, pp. 136-140.

Iyer, et al., "Analyzing and Predicting Language Model Improvements", 1997 IEEE Workshop on Automatic Speech Recognition and Understanding Proceedings, Dec. 1997, pp. 254-261.

Jiang, "Confidence measures for speech recognition: A survey", Elsevier, Speech Communication, Dec. 2004, pp. 455-470.

Klakow et al., Testing the Correlation of Word Error Rate and Perplexity, Elsevier, Speech Communication, May 2001, pp. 1-28.

Mell et al. "The NIST Definition of Cloud Computing", NIST Special Publication 800-145, 2011, 7 pages.

Sak et al., "Mixture of Mixture n-gram language models", ASRU 2013, Dec. 2013, 6 pages.

Suzuki et al., Improvements to N-Gram Language Model Using Text Generated from Neural Language Model, ICASSP 2019, May 2019, pp. 7245-7249.

Wamke et al., "Discriminative estimation of interpolation parameters for language model classifiers", 1999 IEEE International Conference on Acoustics, Speech, and Signal Processing. Proceedings. ICASSP99 ,Mar. 1999, pp. 525-528.

Wang et al., "A New Word Language Model Evaluation Metric For Character Based Languages", CCL 2013, Jan. 2013, 10 pages.

Wikipedia, Expectation—Maximization Algorithm, available at: https://en.wikipedia.org/wiki/Expectation%E2%80%92maximization_algorithm, Last Downloaded Nov. 4, 2020, 12 pages.

* cited by examiner

MULTI-STEP LINEAR INTERPOLATION OF LANGUAGE MODELS

BACKGROUND

The present invention generally relates to speech recognition, and more particularly to multi-step interpolation of language models.

Model interpolation is widely used for improving language model (LM) performance, where optimal weights on LM components are estimated by the condition that the perplexity (PPL) for the development set should be minimized. LM components are trained by using the text of different topics and various styles. Corpora are not only prepared texts (i.e., manual transcripts, written texts, etc.) but also automatically decoded speech (pseudo truths), generated by a RNN model, and transformed text into a target style.

PPL (perplexity) has been believed to be good for optimizing weights on LMs for a long time. This is partly because the calculation is quite fast by the Expectation Maximization (EM) algorithm. In addition, PPL is highly correlated with recognition accuracy (i.e., % WER). However, limitations of this have been pointed out when the LM is trained by out-of-domain text. The model for generating text is usually in-domain based. However, the reliability is unknown, where PPL would not be good for evaluating LMs.

It is best to use recognition accuracy such as % CER (Character Error Rate) and % WER (Word Error Rate) for optimizing weights. However, recognition accuracy requires many iterations of decoding with various weights.

SUMMARY

According to aspects of the present invention, a computer-implemented method is provided for generating a language model for an application. The method includes estimating interpolation weights of each of a plurality of language models according to an Expectation Maximization (EM) algorithm based on a first metric. The method further includes classifying the plurality of language models into two or more sets based on characteristics of the two or more sets. The method also includes estimating a hyper interpolation weight for the two or more sets based on a second metric specific to the application. The method additionally includes interpolating the plurality of language models using the interpolation weights and the hyper interpolation weight to generate a final language model.

According to other aspects of the present invention, a computer program product is provided for generating a language model for an application. The computer program product includes a non-transitory computer readable storage medium having program instructions embodied therewith. The program instructions are executable by a computer to cause the computer to perform a method. The method includes estimating interpolation weights of each of a plurality of language models according to an Expectation Maximization (EM) algorithm based on a first metric. The method further includes classifying the plurality of language models into two or more sets based on characteristics of the two or more sets. The method also includes estimating a hyper interpolation weight for the two or more sets based on a second metric specific to the application. The method additionally includes interpolating the plurality of language models using the interpolation weights and the hyper interpolation weight to generate a final language model.

According to further aspects of the present invention, a computer processing system is provided for generating a language model for an application. The computer processing system includes a memory device for storing program code. The computer processing system further includes a processor device operatively coupled to the memory device for running the program code to estimate interpolation weights of each of a plurality of language models according to an Expectation Maximization (EM) algorithm based on a first metric. The processor device further runs the program code to classify the plurality of language models into two or more sets based on characteristics of the two or more sets. The processor device also runs the program code to estimate a hyper interpolation weight for the two or more sets based on a second metric specific to the application. The processor device additionally runs the program code to interpolate the plurality of language models using the interpolation weights and the hyper interpolation weight to generate a final language model.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to multi-step interpolation of language models.

In one or more embodiments of the present invention, it is proposed to combine Perplexity (PPL) based estimation and accuracy based on in multi-step interpolation, which allows us to calculate better weights at a reasonable computation cost.

Perplexity is a way of evaluating language model. A language model is a probability distribution over entire sentences or texts. Perplexity is a measurement of how well a probability distribution or probability model predicts a sample. Perplexity can be used to compare probability models. A low perplexity indicates the probability distribution is good at predicting the sample. A high perplexity indicates the probability distribution is not good at predicting the sample.

Figure 1:
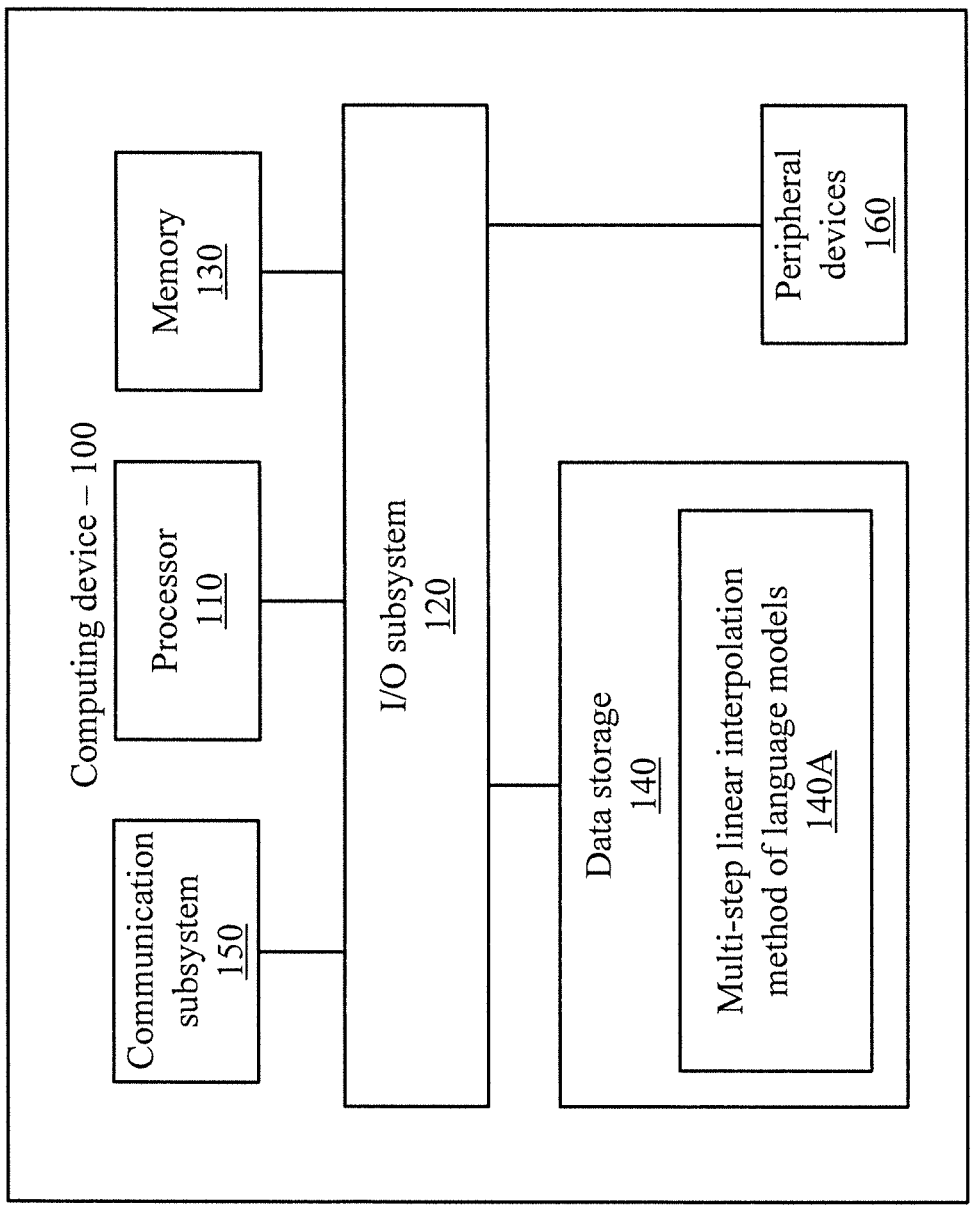
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform multi-step linear interpolation of language models.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for multi-step linear interpolation of language models. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 5-6). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
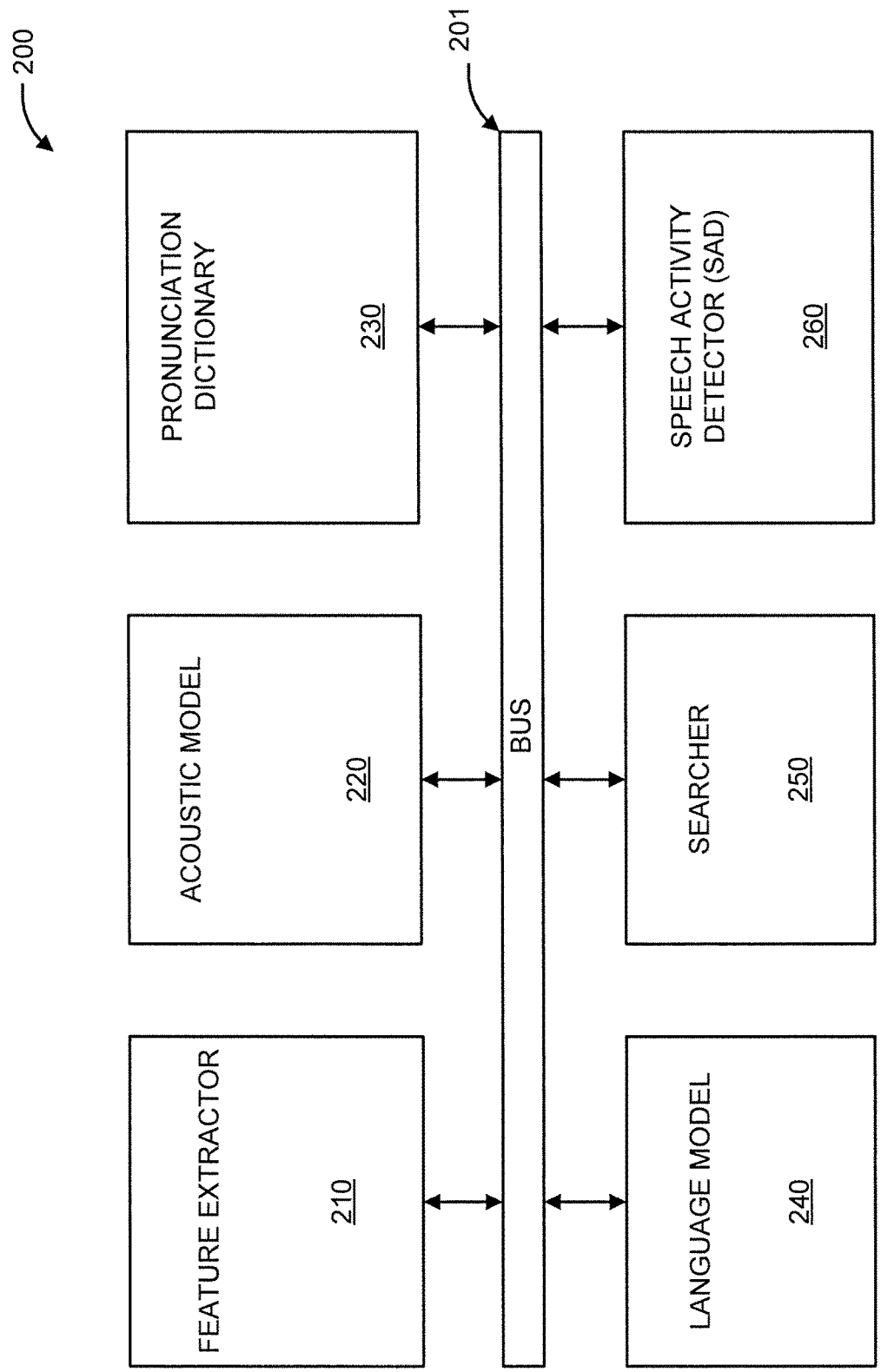
FIG. 2 shows an exemplary automatic speech recognition system (ASR), in accordance with an embodiment of the present principles.

These and other variations of a hardware processor subsystem are also contemplated in accordance with embodiments of the present invention FIG. 2 shows an exemplary automatic speech recognition system (ASR) 200, in accordance with an embodiment of the present principles.

The system 200 includes a feature extractor 210, an acoustic model 220, a pronunciation dictionary 230, a language model 240, a searcher 250, and a speech activity detector 260.

The searcher 250 performs a search using inputs provided from the feature extractor 210, the acoustic model 220, the pronunciation dictionary 230, and the language model 240 to output one or more words representative of a decoded acoustic utterance. While mentioned in singular form, the feature extractor 210, the acoustic model 220, the pronunciation dictionary 230, and the language model can each include more than one of that element. For example, the acoustic model 220 can include multiple acoustic models, at least two being of a different type.

In a word recognition task, given an acoustic signal corresponding to a sequence of words X=x1, x2, ..., xn, the feature extractor 210 first generates a compact representation of the input as sequence of feature vectors Y=y1, y2, ..., yt. Some exemplary features that can be extracted by the feature extractor 210 include, but are not limited to, signal energy, pitch, zero crossing rate, and so forth. It is to be appreciated that the preceding features are merely illustrative and, thus, other features can also be extracted in accordance with the teachings of the present principles, while maintaining the spirit of the present principles.

The acoustic model 220, the pronunciation dictionary 230, and the language model 240 are then used by the searcher 250 to find the most probable word sequence X given these feature vectors. This is done by expressing the desired probability p(X|Y) using Bayes theorem as follows:

$$\hat{X} = \arg\max_X p^{(X|Y)} = \arg\max_X \frac{p(Y|X)_{p(X)}}{p(Y)}$$

where p(X) is the a priori probability of observing a sequence of words in the language, independent of any acoustic evidence and is modeled using the language model component. p(X) corresponds to the likelihood of the acoustic features Y being generated given the word sequence X.

The language model 240 and the acoustic model 220 can be stochastic models trained using large amounts training data. Hidden Markov Models (HMMs) or a hybrid combination of neural networks and HMMs can be used to implement acoustic model 220.

For large vocabulary speech recognition, not all words have an adequate number of acoustic examples in the training data. The acoustic data also covers only a limited vocabulary of words. Instead of modeling incorrect probability distributions of entire words or utterances using limited examples, the acoustic model 220 is built for basic speech sounds. By using these basic units, the system 200 can also recognize words without acoustic training examples. It is to be appreciated that the basic speech sounds can be context independent phones or context dependent phones or any other such speech sounds.

To compute the likelihood p(Y|X), each word in the hypothesized word sequence X is first broken down into its constituent phones using the pronunciation dictionary 230. A single composite acoustic model for the hypothesis is constructed by combining individual phone HMMs. In practice, to account for the large variability of basic speech sounds, HMMs of context dependent speech units with continuous density output distributions can be used. There exist efficient algorithms like the Baum-Welch algorithm to learn the parameters of the acoustic model from training data. Neural network based acoustic models can be used instead of, or in addition to, HMM-GMM based models.

The language model 240 generates the a priori probability p(x). The language model 240 can be an N-gram based language model(s), where typically bi-grams or tri-grams are used. Although p(x) is the probability of a sequence of words, N-grams model this probability assuming the probability of any word xi depends on only N-1 preceding words. These probability distributions are estimated from simple frequency counts that can be directly obtained from large amounts of text. To account for the inability to estimate counts for all possible N-gram sequences, techniques like discounting and back-off are used. The language model 240 can be, but is not limited to, a Neural Network based language model and/or a class based language model.

The speech activity detector 260 detects speech in an input signal that includes one or more acoustic utterances uttered by a speaker, so that the subsequent steps of speech recognition can focus on the speech portions of the input signal.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present principles provided herein, while maintaining the spirit of the present principles. Moreover, it is to be appreciated that other types and configurations of a speech recognition system can also be used in accordance with the teachings of the present principles, while maintaining the spirit of the present principles. For example, the ASR system can also be simple recognizer just recognizing phonemes, it could be a simple isolated word recognizer, a digit recognizer based on rules or a large vocabulary continuous speech recognizer, the components of which we have described. These and other types of speech recognition systems and constituent elements are readily determined by one of ordinary skill in the art, given the teachings of the present principles provided herein, while maintaining the spirit of the present principles.

Figure 3:
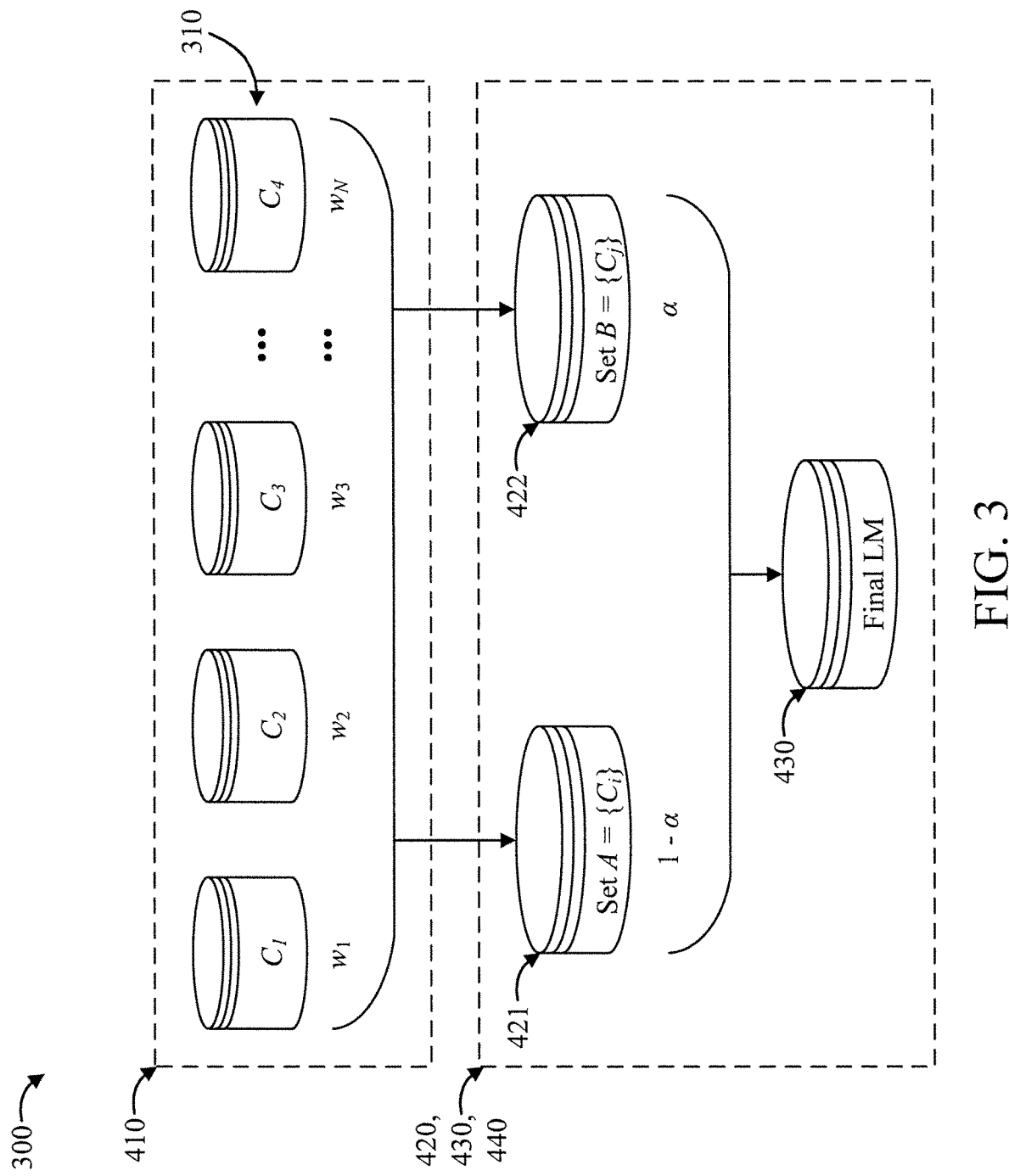
FIG. 3 is a high level diagram showing an exemplary system/method for multi-step linear interpolation of language models, in accordance with an embodiment of the present invention.

FIG. 3 is a high level diagram showing an exemplary system/method 300 for multi-step linear interpolation of language models, in accordance with an embodiment of the present invention.

Figure 4:
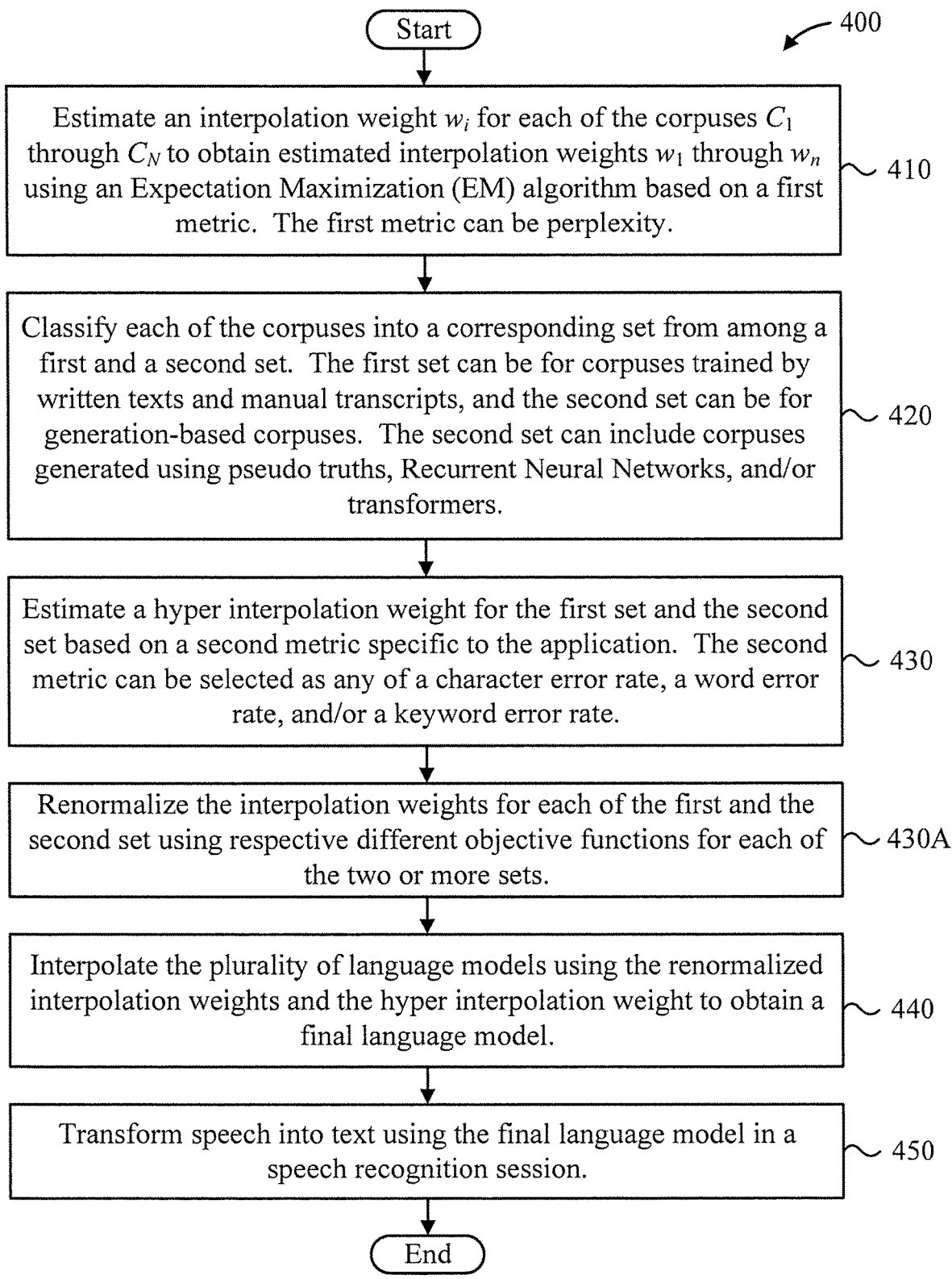
FIG. 4 is a flow diagram further showing portions of method of FIG. 2, in accordance with an embodiment of the present invention.

FIG. 4 is a flow diagram further showing portions of method 300 of FIG. 2, in accordance with an embodiment of the present invention.

The system 300 involves a set of databases 310, each storing a respective corpus $C_i$ from among corpuses $C_1$ through $C_N$. Each of the corpuses is associated with a respect estimated interpolation weight $w_i$ from among $w_1$ through $w_n$. Each of the corpuses can be considered to represent a respective language model.

At block 410, estimate an interpolation weight $w_i$ for each of the corpuses $C_1$ through $C_N$ to obtain estimated interpolation weights $w_1$ through $w_n$ using an Expectation Maximization (EM) algorithm based on a first metric. In an embodiment, the first metric can be perplexity. Of course, in other embodiments, other metrics can be used. In an embodiment, the first metric is limited to entropy based one (e.g., PPL). EM should be applicable in this estimation block. Otherwise, metrics such as e.g., % WER, do not work with EM.

At block 420, classify each of the corpuses into a corresponding set from among a first 321 and a second set 322. In an embodiment, the first set 321 can be for corpuses trained by written texts and manual transcripts, and the second set can be for generation-based corpuses. In an embodiment, the second set 322 can include corpuses generated using pseudo truths, Recurrent Neural Networks, and/or transformers. The sets can be divided based on characteristics of the datasets. These characteristics can include a data generation method of the sets, corpus date (recent, old), corpus style (colloquial, written, formal), and so forth.

At block 430, estimate a hyper interpolation weight for the first set 321 and the second set 322 based on a second metric specific to the application. In an embodiment, the second metric can be selected as any of a character error rate, a word error rate, a keyword error rate, and an empirical metric based on human perception. Examples include, but are not limited to, bilingual evaluation understudy (BLEU), slot error rate, and so forth. BLUE is an algorithm for evaluating the quality of text which has been machine-translated from one natural language to another. Quality is considered to be the correspondence between a machine's output and that of a human: "the closer a machine translation is to a professional human translation, the better it is"—this is the central idea behind BLEU.

In an embodiment, block 430 can include block 430A.

At block 430A, renormalize the interpolation weights for each of the first 321 and the second set 322 using respective different objective functions for each of the two or more sets. This is described in further detail hereinbelow. However, it is to be appreciated that a goal here is to separate those corpuses and to process them separately, then apply the final metric.

That is, the objective here is to separate LM components which could be overestimated by entropy based metric (i.e. PPL). A sample of general rules for the classification is as follows. The size of transcribed corpus usually is not so large because transcription cost is high. However, it is best matched. On the other hand, generated text by a RNN and pseudo truth text (ASR out corpus) are huge and easy to be overestimated even if it is not so well matched. They should be therefore processed separately. Medium size ones (not transcripts) and huge scraped ones (from Web sites) can be classified to another separate set (in total 3 groups). It is still possible to obtain the weights (by the final metric).

At block 440, interpolate the plurality of language models using the renormalized interpolation weights and the hyper interpolation weight to obtain a final language model 330.

At block 450, transform speech into text using the final language model in a speech recognition session. As is evident to one of ordinary skill in the art, a transformation is performed from speech data to textual data.

Further regarding block 430A, the weight on the k-th corpus (renormalized) is as follows for the two sets:

$$C_k \in A : (1-\alpha) \times \frac{w_k}{\sum_{C_i \in A} w_i} ; \text{ and}$$

$$C_k \in B : \alpha \times \frac{w_k}{\sum_{C_i \in A} w_i}.$$

where:
$C_k$: LM component trained from k-th corpus
$w_k$: weight on LM component trained from k-th corpus. These are estimated by PPL in the first step.
$(1-\alpha)$: hyper interpolation weight to set A based LM components.
$\alpha$: hyper interpolation weight to set B based LM components.

The components ($C_k$) are then interpolated in block 440 with the renormalized weights to [53] generate the final LM.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
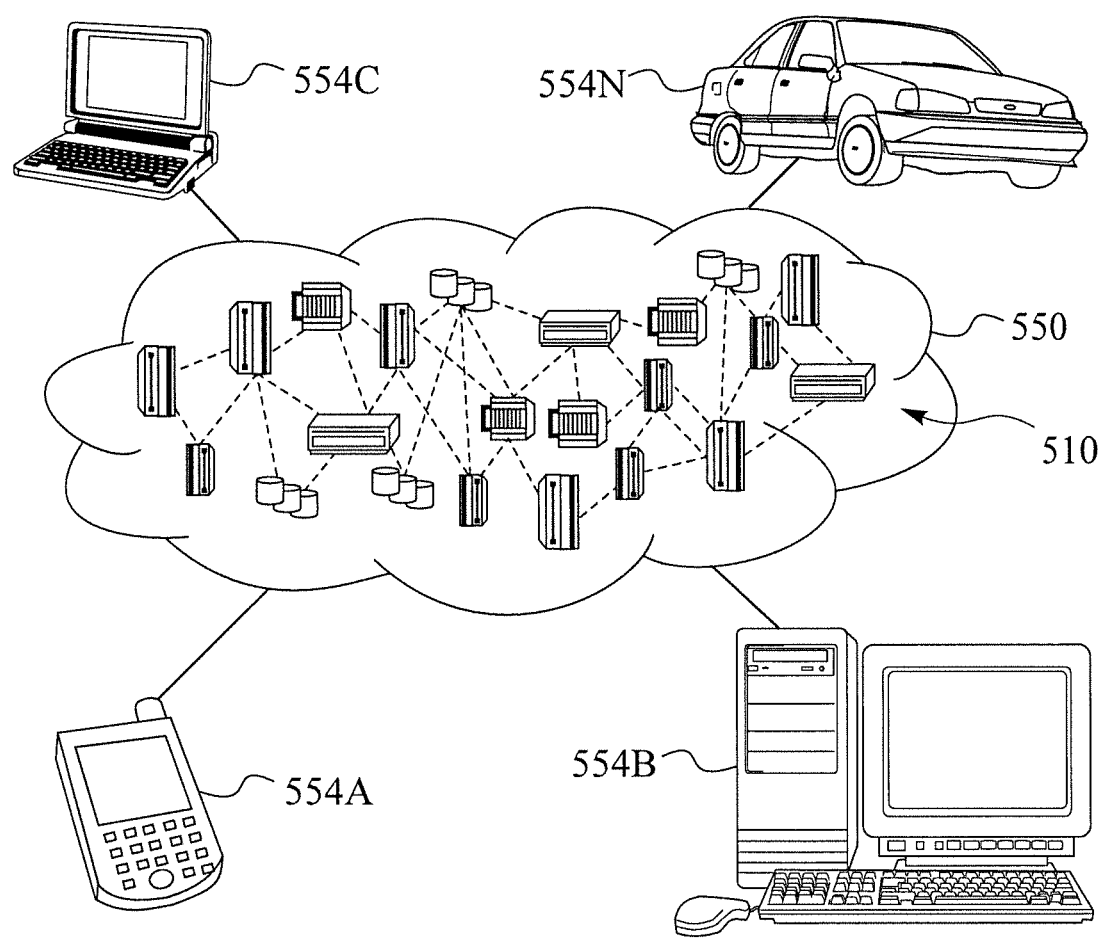
FIG. 5 is a block diagram showing an illustrative cloud computing environment having one or more cloud computing nodes with which local computing devices used by cloud consumers communicate, in accordance with an embodiment of the present invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
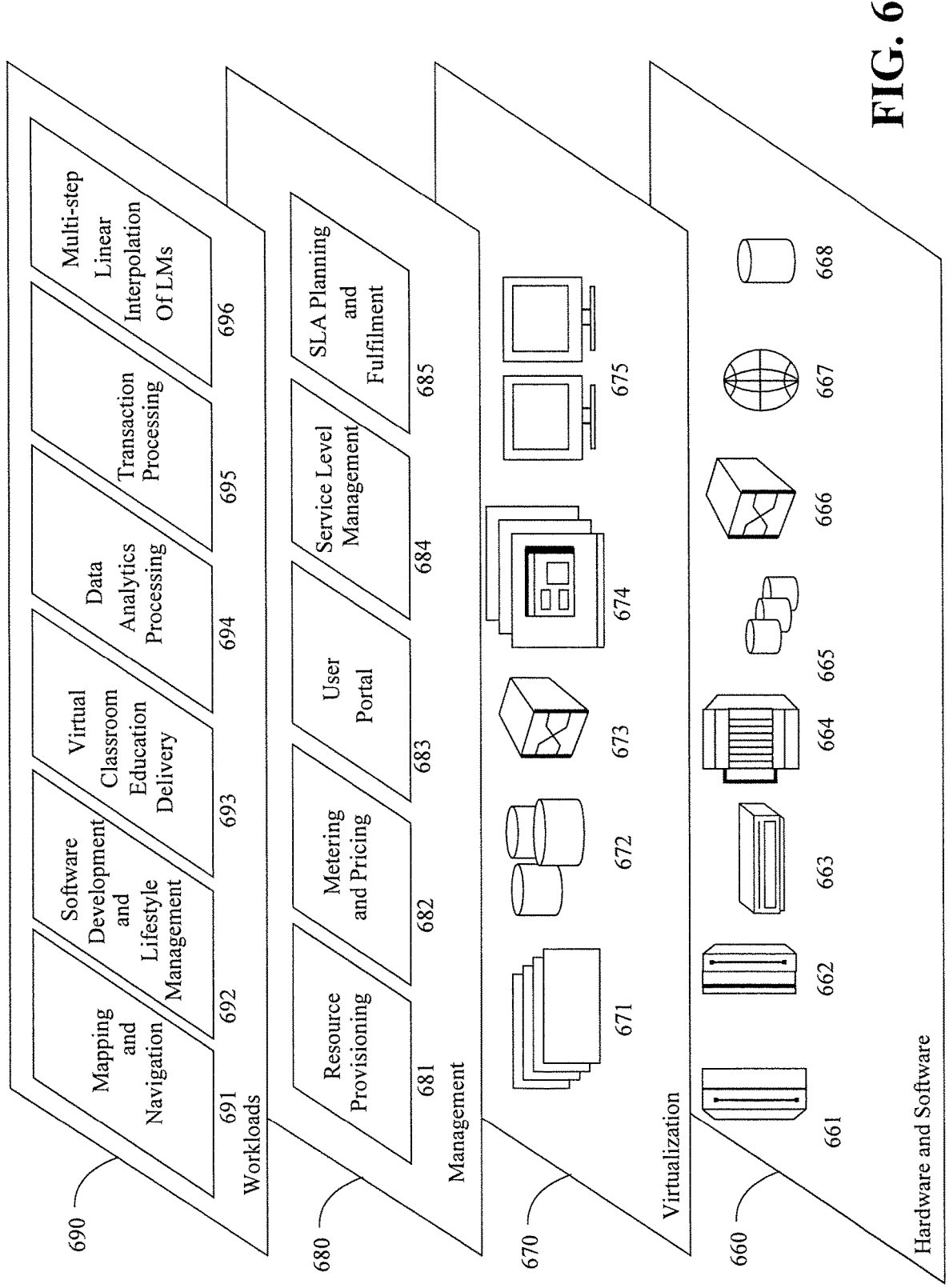
FIG. 6 is a block diagram showing a set of functional abstraction layers provided by a cloud computing environment, in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and multi-step linear interpolation of language models 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for generating a language model for an application, the method comprising:
estimating interpolation weights of each of a plurality of language models according to an Expectation Maximization (EM) algorithm based on an entropy-based first metric;
separating language model components capable of being overestimated by the entropy-based first metric by classifying the plurality of language models into two or more sets based on characteristics of the two or more sets;
estimating a hyper interpolation weight for the two or more sets based on a second metric specific to the application; and
interpolating the plurality of language models using the interpolation weights and the hyper interpolation weight to generate a final language model,
wherein the second metric specific to the application is a character error rate.

2. The computer-implemented method of claim 1, wherein the estimating a hyper interpolation weight includes renormalizing the interpolation weights for each of the two or more sets using respective different objective functions for each of the two or more sets.

3. The computer-implemented method of claim 1, wherein the entropy-based first metric is perplexity.

4. The computer-implemented method of claim 1, wherein the classifying includes classifying the plurality of language models into a first set trained by written texts and manual transcriptions and a second set of generation-based models, wherein the first set and the second set are divided based on corpus date, corpus style, and data generation method.

5. The computer-implemented method of claim 4, wherein the set of generation-based methods includes language models based on pseudo truths generated from a Recurrent Neural Network.

6. The computer-implemented method of claim 1, further comprising transforming speech into text using the final language model in a speech recognition session.

7. The computer-implemented method of claim 1, wherein the plurality of language models comprise n-gram language models.

8. The computer-implemented method of claim 7, wherein n is equal to 2 or more.

9. The computer-implemented method of claim 1, wherein the characteristics of the two or more sets comprise corpus date and corpus style.

10. A computer program product for generating a language model for an application, the computer program product comprising a non-transitory computer readable storage medium having program instructions embodied therewith, the program instructions executable by a computer to cause the computer to perform a method comprising:
estimating interpolation weights of each of a plurality of language models according to an Expectation Maximization (EM) algorithm based on an entropy-based first metric;
separating language model components capable of being overestimated by the entropy-based first metric by classifying the plurality of language models into two or more sets based on characteristics of the two or more sets;
estimating a hyper interpolation weight for the two or more sets based on a second metric specific to the application; and
interpolating the plurality of language models using the interpolation weights and the hyper interpolation weight to generate a final language model,
wherein the second metric specific to the application is a character error rate.

11. The computer program product of claim 10, wherein the estimating a hyper interpolation weight includes renormalizing the interpolation weights for each of the two or more sets using respective different objective functions for each of the two or more sets.

12. The computer program product of claim 10, wherein the entropy-based first metric is perplexity.

13. The computer program product of claim 10, wherein the classifying includes classifying the plurality of language models into a first set trained by written texts and manual transcriptions and a second set of generation-based models, wherein the first set and the second set are divided based on corpus date, corpus style, and data generation method.

14. A computer processing system for generating a language model for an application, the system comprising:
- a memory device for storing program code; and
- a processor device operatively coupled to the memory device for running the program code to:
  - estimate interpolation weights of each of a plurality of language models according to an Expectation Maximization (EM) algorithm based on an entropy-based first metric;
  - separate language model components capable of being overestimated by the entropy-based first metric by classifying the plurality of language models into two or more sets based on characteristics of the two or more sets;
  - estimate a hyper interpolation weight for the two or more sets based on a second metric specific to the application; and
  - interpolate the plurality of language models using the interpolation weights and the hyper interpolation weight to generate a final language model,
  - wherein the second metric specific to the application is a character error rate.

* * * * *